(12) United States Patent
Alabdulmohsen et al.

(10) Patent No.: US 11,591,936 B2
(45) Date of Patent: Feb. 28, 2023

(54) SYSTEMS AND METHODS FOR PROACTIVE OPERATION OF PROCESS FACILITIES BASED ON HISTORICAL OPERATIONS DATA

(71) Applicant: Saudi Arabian Oil Company, Dhahran (SA)

(72) Inventors: Mohammed Tawfeeq Alabdulmohsen, Huffof (SA); Kamarul Ariffin Amminudin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 847 days.

(21) Appl. No.: 16/559,802

(22) Filed: Sep. 4, 2019

(65) Prior Publication Data

US 2021/0062681 A1   Mar. 4, 2021

(51) Int. Cl.

| | |
|---|---|
| *F01K 13/00* | (2006.01) |
| *C10G 5/00* | (2006.01) |
| *F01D 19/00* | (2006.01) |
| *F01K 7/16* | (2006.01) |
| *F01K 13/02* | (2006.01) |
| *G05B 17/02* | (2006.01) |

(Continued)

(52) U.S. Cl.
CPC ............. *F01K 13/006* (2013.01); *C10G 5/00* (2013.01); *F01D 19/00* (2013.01); *F01K 7/165* (2013.01); *F01K 13/02* (2013.01); *F02C 3/00* (2013.01); *F02C 6/00* (2013.01); *F02C 9/00* (2013.01); *G05B 17/02* (2013.01)

(58) Field of Classification Search
CPC ........ F01K 13/006; F01K 7/165; F01K 13/02; C10G 5/00; F01D 19/00; F02C 3/00; F02C 6/00; F02C 9/00; G05B 17/02; G06Q 10/04; G06Q 10/063; G06Q 50/06
See application file for complete search history.

(56) References Cited

U.S. PATENT DOCUMENTS

| | | |
|---|---|---|
| 7,953,585 B2 | 5/2011 | Gurpinar et al. |
| 8,874,409 B2 | 10/2014 | Dhurandhar et al. |

(Continued)

FOREIGN PATENT DOCUMENTS

| | | |
|---|---|---|
| CN | 100487698 C | 10/2007 |
| CN | 102768513 A | 11/2012 |

(Continued)

OTHER PUBLICATIONS

Examination Report for GCC Patent Office Application No. GC 2020-40371, report dated Mar. 9, 2021; pp. 1-5.

(Continued)

*Primary Examiner* — Chad G Erdman
(74) *Attorney, Agent, or Firm* — Bracewell LLP; Constance G. Rhebergen; Brian H. Tompkins

(57) ABSTRACT

Provided are techniques for proactively operating gas-oil separation plant (GOSP) type process facilities that include determining historical operational characteristics of a GOSP for a past time interval using historical operational data for the GOSP, determining expected operating characteristics of the GOSP for a subsequent time interval using the historical operational characteristics, determining an operating plan for the GOSP using the expected operating characteristics, and operating the GOSP in accordance with the operating plan.

21 Claims, 5 Drawing Sheets

(51) Int. Cl.
    *F02C 3/00*     (2006.01)
    *F02C 6/00*     (2006.01)
    *F02C 9/00*     (2006.01)

(56) References Cited

U.S. PATENT DOCUMENTS

| | | |
|---|---|---|
| 9,092,124 B2 | 7/2015 | Amminudin et al. |
| 9,645,575 B2 | 5/2017 | Watson |
| 9,901,868 B2 | 2/2018 | Salu et al. |
| 10,364,662 B1 | 7/2019 | Basu et al. |
| 2007/0275471 A1 | 11/2007 | Coward |
| 2009/0145661 A1 | 6/2009 | Jeffryes et al. |
| 2011/0264415 A1 | 10/2011 | Bleackley et al. |
| 2012/0130696 A1 | 5/2012 | Davidson et al. |
| 2014/0026085 A1 | 1/2014 | Amminudin et al. |
| 2015/0027212 A1 | 1/2015 | Fadlun et al. |
| 2015/0106058 A1 | 4/2015 | Mazzaro et al. |
| 2018/0087357 A1 | 3/2018 | Conn et al. |
| 2018/0087358 A1 | 3/2018 | Conn et al. |
| 2018/0195010 A1 | 7/2018 | Salu et al. |
| 2018/0209248 A1 | 7/2018 | Patel et al. |
| 2018/0335538 A1 | 11/2018 | Dupont et al. |
| 2018/0349930 A1 | 12/2018 | Blomberg et al. |
| 2020/0080407 A1* | 3/2020 | Gunnerud ............ E21B 47/008 |

FOREIGN PATENT DOCUMENTS

| | | |
|---|---|---|
| CN | 103473605 A | 12/2013 |
| CN | 109543206 A | 3/2019 |
| EP | 2004953 | 12/2008 |
| EP | 2201216 B1 | 6/2010 |
| JP | 6150934 B1 * | 6/2017 ............ G05B 23/02 |
| WO | 2014170425 A2 | 10/2014 |
| WO | 2018035718 A1 | 3/2018 |
| WO | 2018202796 A1 | 11/2018 |

OTHER PUBLICATIONS

Devold, Havard; "Oil and gas production handbook: An introduction to oil and gas production, transport, refining and petrochemical industry" ABB Oil and Gas, Aug. 2013; pp. 1-162.

DGH—Directorate General of Hydrocarbons "Reservoir Monitoring" available as of Apr. 19, 2019 at the website: http://dghindia.org/index.php/page?pageId=92; pp. 1-2.

GE Digital "SmartSignal 6.2" available as of Apr. 1, 2019 at the website: https://www.ge.com/digital/sites/default/files/download_assets/smartsignal-datasheet.pdf; pp. 1-3.

Softweb solutions "How predictive maintenance can help the oil refining and petrochemical companies" available as of Apr. 19, 2019 at the website: https://www.softwebsolutions.com/resources/predictive-maintenance-for-oil-and-gas-industry.html; pp. 1-6.

International Search Reporting and Written Opinion for International Application No. PCT/US2020/049512, report dated Dec. 3, 2020; pp. 1-15.

* cited by examiner

SYSTEMS AND METHODS FOR PROACTIVE OPERATION OF PROCESS FACILITIES BASED ON HISTORICAL OPERATIONS DATA

FIELD

Embodiments relate generally to operation of process facilities and more particularly to proactive operation of gas-oil separation plant (GOSP) type process facilities.

BACKGROUND

Process facilities (or "plants") include establishments that are operated to prepare, treat, or converts tangible goods into another form of tangible good that may be further processed or a finished good. For example, an oil production plant typically processes production fluid from oil wells to separate out components of the production fluid and prepare them for export. A gas-oil separation plant (GOSP) is an oil production plant that operates to separate gas and crude oil from production fluid. A GOSP may, for example, be located between a wellhead of a well and a production pipeline used to transport the separated components of the production fluid. Process facilities typically consume resources to "power" the processes. For example, a GOSP may consume fuel gas and electrical power to drive process machines, such as turbines heat recovery steam generator (HRSGs) and boilers that operate to generate power and steam for use in separating gas and crude oil from production fluid.

SUMMARY

It is desirable to operate process facilities (or "plants") in an efficient and effective manner. For example, it can be desirable to operate a GOSP in a manner that consumes a minimum amount of resources needed to effectively process the incoming production fluid. In some instances, process facilities are operated in a reactive manner based on current operating conditions. For example, in the case of a GOSP, an operator may run enough gas turbines, heat recovery steam generator (HRSG) and boilers to generate energy and steam needed for the ongoing process. The operator may make adjustments on-the-fly, such as brining an additional boiler on line or taking a boiler off line, in response to the current operating conditions. Unfortunately, a reactive approach can generate inefficiencies or deficiencies in operation. For example, if the demand for steam decreases, unneeded components of the GOSP, such gas turbines, HRSGs and boilers, may be operating and consuming fuel gas even though they are not needed. As another example, if the demand for steam increases, needed components of the GOSP, such gas turbines, HRSGs and boilers, may need to be brought on line to meet the demand for steam. The delay in bringing these types of components on line may create a bottle-neck that prevents the GOSP from effectively handing the incoming production flow.

Recognizing these and other shortcomings of existing techniques, provided are embodiments for proactively operating process facilities, such as GOSPs. In some embodiments, historical operational characteristics of a GOSP are determined for a past (or "historical") time interval (e.g., for the months, the weeks, and the days leading up to a point in time) using historical operational data for the GOSP, the historical operational characteristics are used to determine expected (or "predicted") operating characteristics of the GOSP for a subsequent (or "future") time interval (e.g., the day, the week, and the month following the point in time), the expected operating characteristics are used to determine an operating plan for the GOSP (e.g., a plan specifying a number of gas turbines, HRSGs or boilers to run, and fuel gas to be consumed), and the GOSP is operated in accordance with the operating plan.

In some embodiments, the historical operational characteristics are used to generate a transition probability matrix that indicates probabilities of moving between different values (or "states") of the operational characteristics, and the transition probability matrix is used in conjunction with the historical operational characteristics to determine the expected operating characteristics of the GOSP. In certain embodiments, an optimal value for the operational characteristics are generated for a corresponding expected oil production and a corresponding expected water injection rate using the historical operational characteristics, and the optimal values are compared to the expected values of corresponding operational characteristics to determine "deltas" that indicate differences between the expected values and the corresponding optimal values. In some embodiments, the "deltas" are provided to an operator (e.g., in the operating plan) to provide an indication of the operational efficiency of the GOSP when operating in accordance with the expected operational characteristics. Such a technique may enable an operator to take proactive measures in anticipation of expected operational characteristics. For example, in view of an operating plan that specifies a number of gas turbines, HRSGs and boilers to run, and an amount of fuel gas to be consumed, an operator may proactively ready the gas turbines, HRSGs and boilers prior to the time they are needed, as well as ensure that sufficient fuel gas is on hand to operate them accordingly. As a result, an operator may be able to operate the GOSP closer to the requirements of the oil production and water injection rates for a well, without having too many or too few resources available for effectively operating the GOSP.

Provided in some embodiments is a method of operating a GOSP that includes the following: obtaining operational data for the GOSP, the operational data indicative of operational characteristics of the GOSP observed over a historical time interval, the historical time interval including an interval of time preceding a given point in time, the operational characteristics including: oil production; power consumption; gas export; crude export; sour gas export; natural gas liquids (NGL) export; fuel gas consumption; and energy key performance indicator (KPI); determining, based on the operational data, historical operational characteristics of the GOSP for the historical time interval, the historical operational characteristics including, for each of the operational characteristics: (a) for each month of the historical time interval, an average monthly value determined based on values of the operational characteristic over the month; (b) for each week of the historical time interval, an average weekly value determined based on values of the operational characteristic over the week; and (c) for each day of the historical time interval, a daily value determined based on a value of the operational characteristic for the day: determining, based on the historical operational characteristics, expected operational characteristics of the GOSP for a future time interval, the future time interval including an interval of time following the given point in time, the expected operational characteristics including, for each of the operational characteristics: (a) an expected next month value determined based on the average monthly values for the operational characteristic; (b) an expected next week value determined based on the average weekly values for the operational characteristic; and (c) an expected next day value determined based on the daily values for the operational characteristic; the determination of the expected operational characteristics including: for each of the expected operational characteristics: determining, based on the historical operational characteristics, a transition probability matrix that is indicative of probabilities of moving between possible values of the corresponding operational characteristic; and applying a current value of the operational characteristic corresponding to the transition probability matrix to determine the value of the expected operational characteristic; determining, based on the expected operational characteristics, an operating plan for the GOSP; and operating the GOSP in accordance with the operating plan.

In some embodiments, the method further includes, for each of the expected operational characteristics: determining, based on the historical operational characteristics, an optimal value for the corresponding operational characteristic; and determining a delta value for the expected operational characteristic that is indicative of a difference between the optimal value for the corresponding operational characteristic and the expected operational characteristic, where the operating plan for the GOSP includes the delta values for the expected operational characteristics. In certain embodiments, the historical time interval includes a five year interval of time preceding the given point in time. In some embodiments, the expected operational characteristics include the following: expected next day oil production that is indicative of an expected amount of oil production over the day following the given point in time; expected next week oil production that is indicative of an expected amount of oil production over the week following the given point in time; expected next month oil production that is indicative of an expected amount of oil production over the month following the given point in time; expected next day power consumption that is indicative of an expected amount of power consumption over the day following the given point in time; expected next week power consumption that is indicative of an expected amount of power consumption over the week following the given point in time; expected next month power consumption that is indicative of an expected amount of power consumption over the month following the given point in time; expected next day gas export that is indicative of an expected amount of gas export over the day following the given point in time; expected next week gas export that is indicative of an expected amount of gas export over the week following the given point in time; expected next month gas export that is indicative of an expected amount of gas export over the month following the given point in time; expected next day crude export that is indicative of an expected amount of crude export over the day following the given point in time; expected next week crude export that is indicative of an expected amount of crude export over the week following the given point in time; expected next month crude export that is indicative of an expected amount of crude export over the month following the given point in time; expected next day sour gas export that is indicative of an expected amount of sour gas export over the day following the given point in time; expected next week sour gas export that is indicative of an expected amount of sour gas export over the week following the given point in time; expected next month sour gas export that is indicative of an expected amount of sour gas export over the month following the given point in time; expected next day NGL that is indicative of an expected amount of NGL export over the day following the given point in time; expected next week NGL that is indicative of an expected amount of NGL export over the week following the given point in time; expected next month NGL that is indicative of an expected amount of NGL export over the month following the given point in time; expected next day fuel gas that is indicative of an expected amount of fuel gas consumption over the day following the given point in time; expected next week fuel gas that is indicative of an expected amount of fuel gas consumption over the week following the given point in time; expected next month fuel gas that is indicative of an expected amount of fuel gas consumption over the month following the given point in time; expected next day energy KPI that is indicative of an expected energy KPI for the day following the given point in time; expected next week energy KPI that is indicative of an expected energy KPI for the week following the given point in time; and expected next month energy KPI that is indicative of an expected energy KPI for the month following the given point in time. In certain embodiments, the operating plan for the GOSP specifies the following: a number of gas turbines to operate during a given period of time; a number of HRSGs to operate during the given period of time; a number of boilers to operate during the given period of time; and an amount of fuel gas to be consumed during the given period of time. In some embodiments, operating the GOSP in accordance with the operating plan includes the following: operating the number of gas turbines during the given period of time; operating the number of HRSGs during the given period of time; operating the number of boilers during the given period of time; and providing the amount of fuel gas to be consumed during the given period of time. In certain embodiments, the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

Provided in some embodiments is a GOSP system that includes the following: a GOSP oil production processing system; and a GOSP control system adapted to perform the following operations: obtaining operational data for the GOSP, the operational data indicative of operational characteristics of the GOSP observed over a historical time interval, the historical time interval including an interval of time preceding a given point in time, the operational characteristics including: oil production; power consumption; gas export; crude export; sour gas export; NGL export; fuel gas consumption; and energy KPI; determining, based on the operational data, historical operational characteristics of the GOSP for the historical time interval, the historical operational characteristics including, for each of the operational characteristics: (a) for each month of the historical time interval, an average monthly value determined based on values of the operational characteristic over the month; (b) for each week of the historical time interval, an average weekly value determined based on values of the operational characteristic over the week; and (c) for each day of the historical time interval, a daily value determined based on a value of the operational characteristic for the day: determining, based on the historical operational characteristics, expected operational characteristics of the GOSP for a future time interval, the future time interval including an interval of time following the given point in time, the expected operational characteristics including, for each of the operational characteristics: (a) an expected next month value determined based on the average monthly values for the operational characteristic; (b) an expected next week value determined based on the average weekly values for the operational characteristic; and (c) an expected next day value determined based on the daily values for the operational characteristic the determination of the expected operational characteristics including: for each of the expected operational characteristics: determining, based on the historical operational characteristics, a transition probability matrix that is indicative of probabilities of moving between possible values of the corresponding operational characteristic; and applying a current value of the operational characteristic corresponding to the transition probability matrix to determine the value of the expected operational characteristic; determining, based on the expected operational characteristics, an operating plan for the GOSP; and operating the GOSP in accordance with the operating plan.

In some embodiments, the operations further include, for each of the expected operational characteristics: determining, based on the historical operational characteristics, an optimal value for the corresponding operational characteristic; and determining a delta value for the expected operational characteristic that is indicative of a difference between the optimal value for the corresponding operational characteristic and the expected operational characteristic, where the operating plan for the GOSP includes the delta values for the expected operational characteristics. In certain embodiments, the historical time interval includes a five year interval of time preceding the given point in time. In some embodiments, the expected operational characteristics include the following: expected next day oil production that is indicative of an expected amount of oil production over the day following the given point in time; expected next week oil production that is indicative of an expected amount of oil production over the week following the given point in time; expected next month oil production that is indicative of an expected amount of oil production over the month following the given point in time; expected next day power consumption that is indicative of an expected amount of power consumption over the day following the given point in time; expected next week power consumption that is indicative of an expected amount of power consumption over the week following the given point in time; expected next month power consumption that is indicative of an expected amount of power consumption over the month following the given point in time; expected next day gas export that is indicative of an expected amount of gas export over the day following the given point in time; expected next week gas export that is indicative of an expected amount of gas export over the week following the given point in time; expected next month gas export that is indicative of an expected amount of gas export over the month following the given point in time; expected next day crude export that is indicative of an expected amount of crude export over the day following the given point in time; expected next week crude export that is indicative of an expected amount of crude export over the week following the given point in time; expected next month crude export that is indicative of an expected amount of crude export over the month following the given point in time; expected next day sour gas export that is indicative of an expected amount of sour gas export over the day following the given point in time; expected next week sour gas export that is indicative of an expected amount of sour gas export over the week following the given point in time; expected next month sour gas export that is indicative of an expected amount of sour gas export over the month following the given point in time; expected next day NGL that is indicative of an expected amount of NGL export over the day following the given point in time; expected next week NGL that is indicative of an expected amount of NGL export over the week following the given point in time; expected next month NGL that is indicative of an expected amount of NGL export over the month following the given point in time; expected next day fuel gas that is indicative of an expected amount of fuel gas consumption over the day following the given point in time; expected next week fuel gas that is indicative of an expected amount of fuel gas consumption over the week following the given point in time; expected next month fuel gas that is indicative of an expected amount of fuel gas consumption over the month following the given point in time; expected next day energy KPI that is indicative of an expected energy KPI for the day following the given point in time; expected next week energy KPI that is indicative of an expected energy KPI for the week following the given point in time; and expected next month energy KPI that is indicative of an expected energy KPI for the month following the given point in time. In certain embodiments, the operating plan for the GOSP specifies the following: a number of gas turbines to operate during a given period of time; a number of HRSGs to operate during the given period of time; a number of boilers to operate during the given period of time; and an amount of fuel gas to be consumed during the given period of time. In some embodiments, operating the GOSP in accordance with the operating plan includes: operating the number of gas turbines during the given period of time; operating the number of HRSGs during the given period of time; operating the number of boilers during the given period of time; and providing the amount of fuel gas to be consumed during the given period of time. In certain embodiments, the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

Provided in some embodiments is non-transitory computer readable storage medium having program instructions stored thereon that are executable by a processor to perform the following operations for operating a GOSP: obtaining operational data for the GOSP, the operational data indicative of operational characteristics of the GOSP observed over a historical time interval, the historical time interval including an interval of time preceding a given point in time, the operational characteristics including: oil production; power consumption; gas export; crude export; sour gas export; NGL export; fuel gas consumption; and energy KPI; determining, based on the operational data, historical operational characteristics of the GOSP for the historical time interval, the historical operational characteristics including, for each of the operational characteristics: (a) for each month of the historical time interval, an average monthly value determined based on values of the operational characteristic over the month; (b) for each week of the historical time interval, an average weekly value determined based on values of the operational characteristic over the week; and (c) for each day of the historical time interval, a daily value determined based on a value of the operational characteristic for the day: determining, based on the historical operational characteristics, expected operational characteristics of the GOSP for a future time interval, the future time interval including an interval of time following the given point in time, the expected operational characteristics including, for each of the operational characteristics: (a) an expected next month value determined based on the average monthly values for the operational characteristic; (b) an expected next week value determined based on the average weekly values for the operational characteristic; and (c) an expected next day value determined based on the daily values for the operational characteristic; the determination of the expected operational characteristics including: for each of the expected operational characteristics: determining, based on the historical operational characteristics, a transition probability matrix that is indicative of probabilities of moving between possible values of the corresponding operational characteristic; and applying a current value of the operational characteristic corresponding to the transition probability matrix to determine the value of the expected operational characteristic; determining, based on the expected operational characteristics, an operating plan for the GOSP; and operating the GOSP in accordance with the operating plan.

In some embodiments, the operations further include: for each of the expected operational characteristics: determining, based on the historical operational characteristics, an optimal value for the corresponding operational characteristic; and determining a delta value for the expected operational characteristic that is indicative of a difference between the optimal value for the corresponding operational characteristic and the expected operational characteristic, where the operating plan for the GOSP includes the delta values for the expected operational characteristics. In certain embodiments, the historical time interval includes a five year interval of time preceding the given point in time. In some embodiments, the expected operational characteristics include the following: expected next day oil production that is indicative of an expected amount of oil production over the day following the given point in time; expected next week oil production that is indicative of an expected amount of oil production over the week following the given point in time; expected next month oil production that is indicative of an expected amount of oil production over the month following the given point in time; expected next day power consumption that is indicative of an expected amount of power consumption over the day following the given point in time; expected next week power consumption that is indicative of an expected amount of power consumption over the week following the given point in time; expected next month power consumption that is indicative of an expected amount of power consumption over the month following the given point in time; expected next day gas export that is indicative of an expected amount of gas export over the day following the given point in time; expected next week gas export that is indicative of an expected amount of gas export over the week following the given point in time; expected next month gas export that is indicative of an expected amount of gas export over the month following the given point in time; expected next day crude export that is indicative of an expected amount of crude export over the day following the given point in time; expected next week crude export that is indicative of an expected amount of crude export over the week following the given point in time; expected next month crude export that is indicative of an expected amount of crude export over the month following the given point in time; expected next day sour gas export that is indicative of an expected amount of sour gas export over the day following the given point in time; expected next week sour gas export that is indicative of an expected amount of sour gas export over the week following the given point in time; expected next month sour gas export that is indicative of an expected amount of sour gas export over the month following the given point in time; expected next day NGL that is indicative of an expected amount of NGL export over the day following the given point in time; expected next week NGL that is indicative of an expected amount of NGL export over the week following the given point in time; expected next month NGL that is indicative of an expected amount of NGL export over the month following the given point in time; expected next day fuel gas that is indicative of an expected amount of fuel gas consumption over the day following the given point in time; expected next week fuel gas that is indicative of an expected amount of fuel gas consumption over the week following the given point in time; expected next month fuel gas that is indicative of an expected amount of fuel gas consumption over the month following the given point in time; expected next day energy KPI that is indicative of an expected energy KPI for the day following the given point in time; expected next week energy KPI that is indicative of an expected energy KPI for the week following the given point in time; and expected next month energy KPI that is indicative of an expected energy KPI for the month following the given point in time. In certain embodiments, the operating plan for the GOSP specifies the following: a number of gas turbines to operate during a given period of time; a number of heat recovery steam generator (HRSGs) to operate during the given period of time; a number of boilers to operate during the given period of time; and an amount of fuel gas to be consumed during the given period of time. In some embodiments, operating the GOSP in accordance with the operating plan includes: operating the number of gas turbines during the given period of time; operating the number of HRSGs during the given period of time; operating the number of boilers during the given period of time; and providing the amount of fuel gas to be consumed during the given period of time. In certain embodiments, the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

Figure 1:
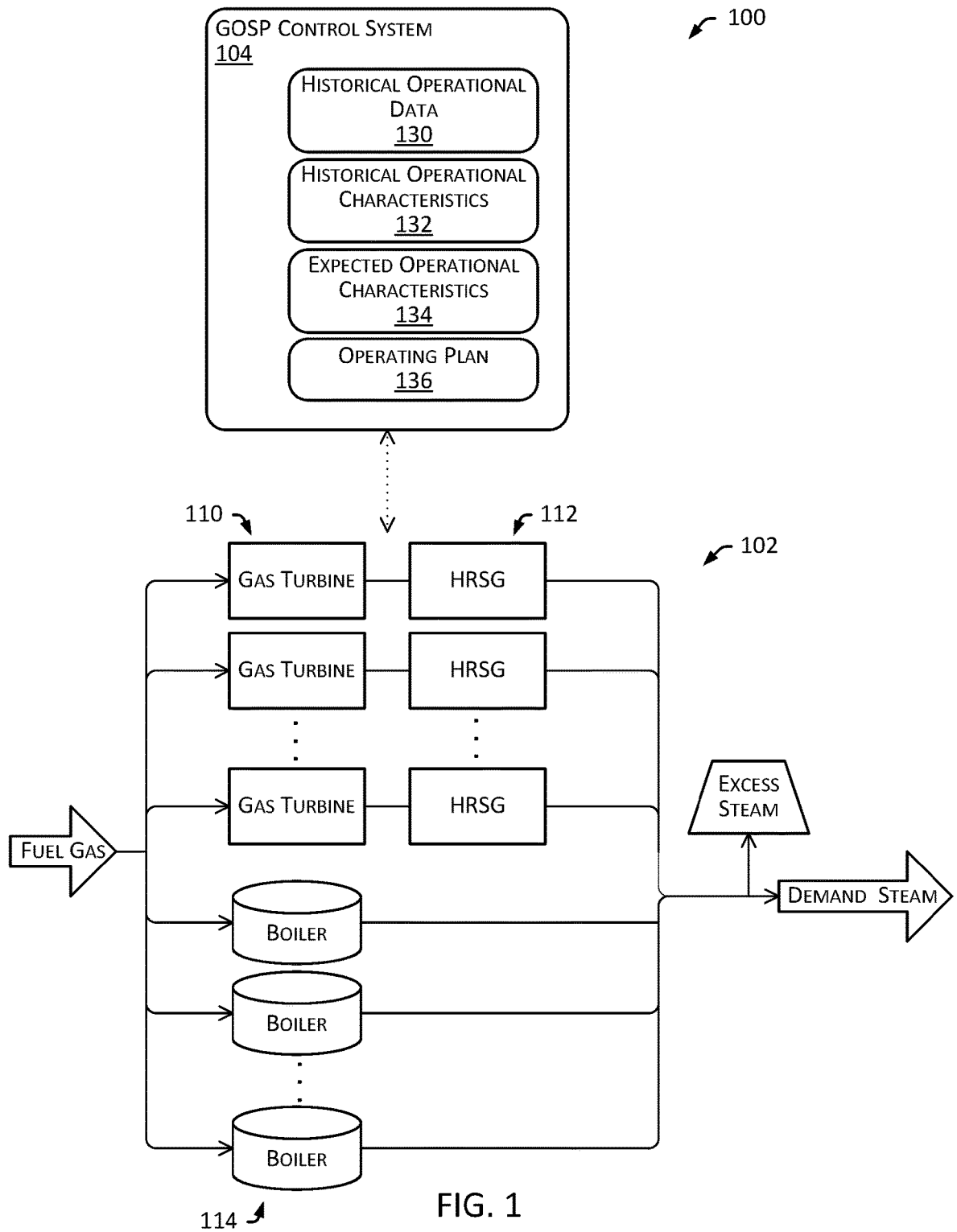
FIG. 1 is diagram that illustrates a process facility environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for proactively operating process facilities, such as GOSPs. In some embodiments, historical operational characteristics of a GOSP are determined for a past (or "historical") time interval (e.g., for the months, the weeks, and the days leading up to a point in time) using historical operational data for the GOSP, the historical operational characteristics are used to determine expected (or "predicted") operating characteristics of the GOSP for a subsequent (or "future") time interval (e.g., the day, the week, and the month following the point in time), the expected operating characteristics are used to determine an operating plan for the GOSP (e.g., a plan specifying a number of gas turbines, HRSGs or boilers to run, and fuel gas to be consumed), and the GOSP is operated in accordance with the operating plan.

In some embodiments, the historical operational characteristics are used to generate a transition probability matrix that indicates probabilities of moving between different values (or "states") of the operational characteristics, and the transition probability matrix is used in conjunction with the historical operational characteristics to determine the expected operating characteristics of the GOSP. In certain embodiments, an optimal value for the operational characteristics are generated for a corresponding expected oil production and a corresponding expected water injection rate using the historical operational characteristics, and the optimal values are compared with the expected values of corresponding operational characteristics to determine "deltas" that indicate differences between the expected values and the corresponding optimal values. In some embodiments, the "deltas" are provided to an operator (e.g., in the operating plan) to provide an indication of the operational efficiency of the GOSP when operating in accordance with the expected operational characteristics. Such a technique may enable an operator to take proactive measures in anticipation of expected operational characteristics. For example, in view of an operating plan that specifies a number of gas turbines, HRSGs and boilers to run, and an amount of fuel gas to be consumed, an operator may proactively ready the gas turbines, HRSGs and boilers prior to the time they are needed, as well as ensure that sufficient fuel gas is on hand to operate them accordingly. As a result, an operator may be able to operate the GOSP closer to the requirements of the oil production and water injection rates for a well, without having too many or too few resources available for effectively operating the GOSP.

Although certain embodiments are described in the context of GOSPs for the purpose of illustration, the techniques described may be applied in other context, such as in other types of process facilities.

FIG. 1 is diagram that illustrates a gas-oil separation plant (GOSP) 100 in accordance with one or more embodiments. In the illustrated embodiment, the GOSP 100 includes an oil production processing system (e.g., including steam generation system) 102 and a GOSP control system ("control system") 104.

In some embodiments, the GOSP 100 is an oil production plant that is operable to separate gas and crude oil from production fluid. The production fluid may be, for example, production fluid extracted from a subsurface formation by way of a hydrocarbon well. The GOSP 100 may, for example, be located between a wellhead of the well and a production pipeline used to transport the separated components of the production fluid. During operation, the GOSP 100 may consume fuel gas (and electrical power) to drive process machines, such as gas turbines 110, heat recovery steam generators (HRSGs) 112 and boilers 114 that operate to generate energy and steam for use in separating gas and crude oil from the production fluid. Steam that is generated and used or needed for processes may be referred to as "demand steam." Steam that is generated but not used or needed may be referred to as "excess steam." The gas turbines 110 may be combustion turbines operate to generate shaft work by rotation of a turbine shaft and output hot gas stream of steam that is fed to an HRSG 112. The shaft work may be provide energy employed for use in other parts of the GOSP 100. The HRSG 112 may be an energy recovery heat exchanger that recovers heat from a hot gas stream of steam of a gas turbine 110. The recovered heat may provide energy employed for use in other parts of the GOSP 100. The boilers 114 may be steam generators that generate steam by applying heat energy to water. Operation of the turbines 110 and the boilers 114 may be driven by supplied fuel gas. The fuel gas may be, for example, hydrocarbons (such as methane or propane), hydrogen, carbon monoxide, or mixtures thereof. During operation, some or all of the steam exiting the HRSGs 112 and the boilers 114 may be routed as demand steam for use in other parts of the GOSP 100 or be routed as excess steam. The excess steam may, for example, be routed to a turbine that is operated to extract energy from the excess steam. In some embodiments, a given number of the gas turbines 110 and HRSGs 112 may be brought on line (or "operated") to supply a needed quantity of demand steam. In some embodiments, boilers 114 may be brought on line to help supply the needed quantity of demand steam. For example, if the gas turbines 110 and HRSGs 112 operating to generate work and heat (e.g., for use in other parts of the GOSP 100) are unable to (or are not expected to) supply the needed quantity of demand steam, one or more of the boilers 114 may be brought on line to supplement the supply of demand steam.

In some embodiments, the control system 104 controls operation of the GOSP 100, including the oil production processing system 102. For example, the control system 104 may regulate which of the gas turbines 110, the HRSGs 112, and the boilers 114 are online to support operation of the GOSP 100, and may provide for routing of work energy, heat energy and steam to appropriate processes within the GOSP 100.

In some embodiments, the control system 104 records (or otherwise has access to) historical GOSP operational data ("historical operational data") 130. The historical operational data 130 may include, for example, a record of actual (or "observed") operational characteristics exhibited by the GOSP 100 in the past. In some embodiments, the operational characteristics include characteristics relating to items produced or consumed during operation of the GOSP 100. For example, the operational characteristics may include the following: oil production (e.g., indicative of a volume of oil produced and processed by the GOSP 100); power consumption (e.g., indicative of an amount of power consumed (or "used") by the GOSP 100); gas export (e.g., indicative of a volume of gas product produced/exported by the GOSP 100); crude export (e.g., indicative of a volume of crude oil product produced/exported by the GOSP 100); sour gas export (e.g., indicative of a volume of sour gas product produced/exported by the GOSP 100); natural gas liquids (NGL) export) (e.g., indicative of a volume of NGL product produced/exported by the GOSP 100); and fuel gas consumption (e.g., indicative of an amount of fuel gas consumed (or "used") by the GOSP 100).

The historical operational data 130 may include, for example, for each of the operational characteristics, a daily value, an average weekly value and an average monthly value for each of the respective days, weeks and months of a past (or "historical") time interval. A daily value for an operational characteristic may be, for example, a total of the operational characteristic for a respective day, the average weekly value for an operational characteristic may be an average of the daily values of the operational characteristic for a given week, and the average monthly value for an operational characteristic may be an average of the daily or weekly values of the operational characteristic for a given month.

In some embodiments, the control system 104 generates (or otherwise has access to) historical GOSP operational characteristics ("historical operational characteristics") 132. The historical operational characteristics 132 may include, for example, past (or "historical") operational characteristics of the GOSP 100 determined based on the historical operational data 130. The historical operational characteristics 132 may include the following for each of the operational characteristics: (a) for each day of the historical time interval, a daily value determined based on a value of the operational characteristic for the day; (b) for each week of the historical time interval, an average weekly value determined based on values of the operational characteristic over the week; and (c) for each month of a historical time interval, an average monthly value determined based on values of the operational characteristic over the month. In some embodiments, the historical operational characteristics 132 include energy key performance indicators (KPIs). As described here, an energy KPIs for a given period of time may be indicative of a ratio of resource consumption to product production for the given period of time.

In some embodiments, the control system 104 generates (or otherwise has access to) expected GOSP operational characteristics ("expected operational characteristics") 134. The expected operational characteristics 134 may include, for example, expected (or "predicted") operational characteristics of the GOSP 100 determined based on historical operational characteristics 132. The expected operational characteristics 134 may include the following for each of the operational characteristics: (a) an expected daily value (e.g., determined based on the "historical" daily values for the operational characteristic); (b) an expected weekly value (e.g., determined based on the "historical" average weekly values for the operational characteristic); and (c) an expected monthly value (e.g., determined based on the "historical" average monthly values for the operational characteristic). In some embodiments, the expected operational characteristics 134 include an "optimal" value for each of some or all of the operational characteristics. In some embodiments, the expected operational characteristics 134 include, for each of some or all of the operational characteristics, a "delta" value that indicates a difference between the expected value for the operational characteristic and corresponding optimal value for the operational characteristic.

In some embodiments, the control system 104 generates (or otherwise has access to) a GOSP operating plan ("operating plan") 136. The operating plan 136 may include, for example, a recommended plan for operating of the GOSP 100 over a day, week, or month. The operating plan 136 may specify, for example, a number of gas turbines 110 and HRSGs 112 to run, a number of boilers 114 to run, and an amount of fuel gas to be consumed (as well as a total amount of steam to be generated, a minimum amount of excess steam to be generated, a total amount of demand steam to be generated) for the following day, week, or month. In some embodiments, the operating plan 136 also includes the "optimal" value or "delta" value for each of some or all of the operational characteristics.

In some embodiments, the control system 104 (or another operator of the GOSP 100) controls operation of the GOSP 100 in accordance with the operating plan 136. For example, the control system 104 (or another operator of the GOSP 100) may confirm that the fuel gas to be consumed for the next, day, week or month is on hand and available for use, and may operate the specified number of gas turbines 110, HRSGs 112 or boilers 114 during the corresponding period(s) of time.

In some embodiments, the control system 104 (or another operator of the GOSP 100) stores the historical operational data 130, the historical operational characteristics 132, the expected operational characteristics 134, the operating plan 136, or related data in a computer memory of the control system 104.

Figure 2:
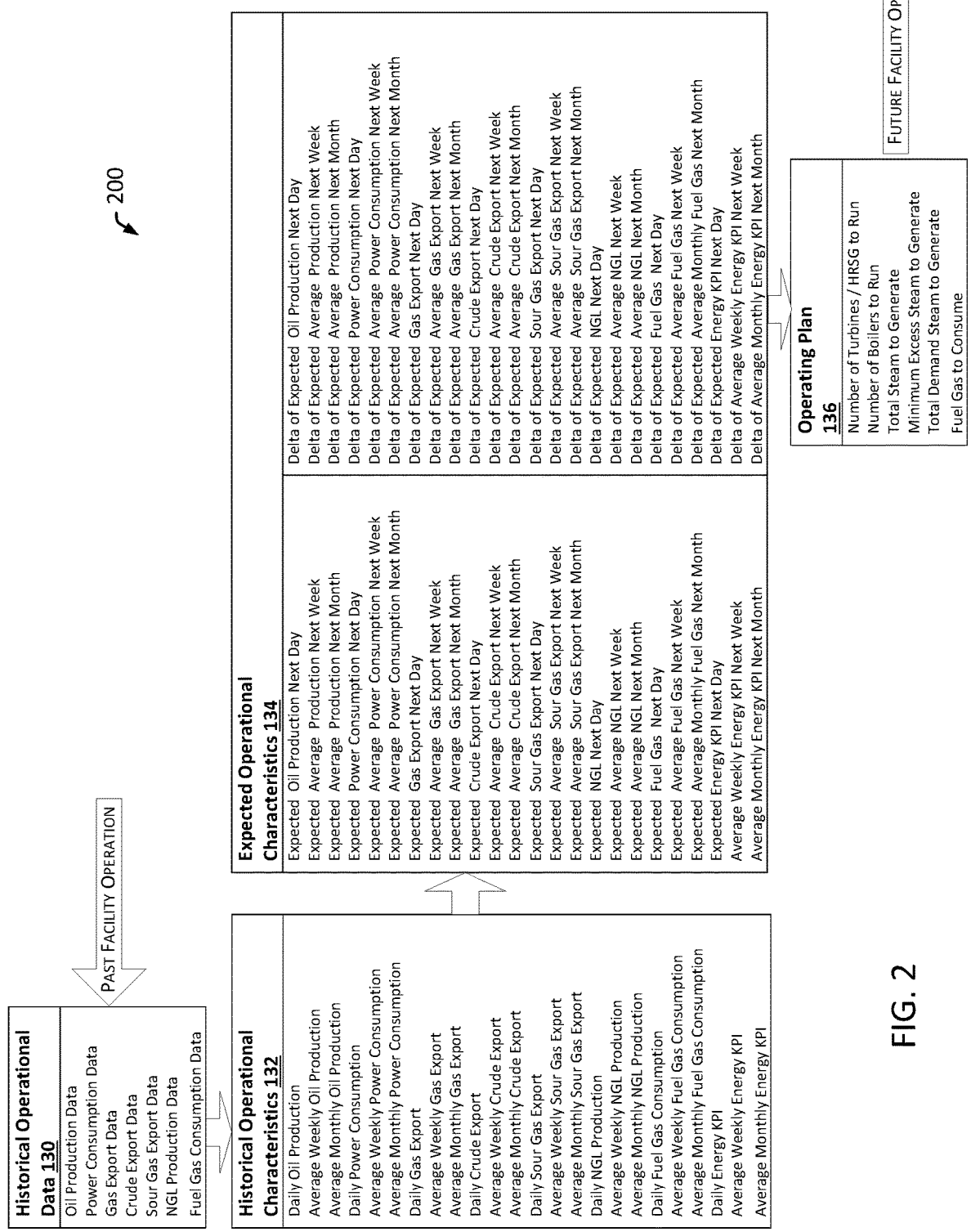
FIG. 2 is a flow diagram that illustrates a method of operating a process facility in accordance with one or more embodiments.

FIG. 2 is a flow diagram that illustrates a method 200 of operating the GOSP 100 in accordance with one or more embodiments. In some embodiments, historical operational characteristics 132 for the GOSP 100 are determined based on historical operational data 130 for a past (or "historical") time interval (e.g., for the months, the weeks, and the days of the five years leading up to a point in time), the historical operational characteristics 132 are used to determine expected (or "predicted") operational characteristics 134 of the GOSP 100 for a subsequent (or "future") time interval (e.g., the day, the week, or the month following the point in time), the expected operational characteristics 134 are used to determine an operating plan 136 for the GOSP 100 (e.g., a plan specifying a number of the gas turbines 110 and the HRSGs 112 to run, a number of the boilers 114 to run, and an amount of fuel gas to be consumed). The GOSP 100 may, then, be operated in accordance with the operating plan 136 (e.g., over the next day, week, or month following the point in time).

In some embodiments, the historical operational characteristics 132 are used to generate a transition probability matrix that indicates probabilities of moving between different values (or "states") of the operational characteristics, and the transition probability matrix is used in conjunction with the historical operational characteristics 132 to determine the expected operational characteristics 134 of the GOSP 100. In certain embodiments, an "optimal" value for each of the operational characteristics are generated for a corresponding expected oil production and a corresponding expected water injection rate using the historical operational characteristics 132, and the optimal values are compared to the expected values of corresponding operational characteristics to determine "deltas" that indicate differences between the expected values and the corresponding optimal values. In some embodiments, the "deltas" may be provided to an operator (e.g., in the operating plan 136) to provide an indication of the operational efficiency of the GOSP 100 when operating in accordance with the expected operational characteristics 134. Such a technique may enable the control system 104 (or another operator of the GOSP 100) to take proactive measures in anticipation of expected operational characteristics. For example, in view of the operating plan 136 specifying a given number of the gas turbines 110 and the HRSGs 112 to run, a given number of boilers 114 to run and a given amount of fuel gas to be consumed, the control system 104 (or another operator of the GOSP 100) may confirm that the amount of fuel gas to be consumed for the next, day, week or month is on hand and available, and may operate the specified number of gas turbines 110, HRSGs 112 or boilers 114 during the corresponding period(s) of time. As a result, the control system 104 (or another operator of the GOSP 100) may be able to anticipate operating conditions of the GOSP 100 and, in turn, operate the GOSP 100 closer to the requirements of the oil production and water injection for a well, without having too many or too few resources available for operation of the GOSP 100.

Figure 3:
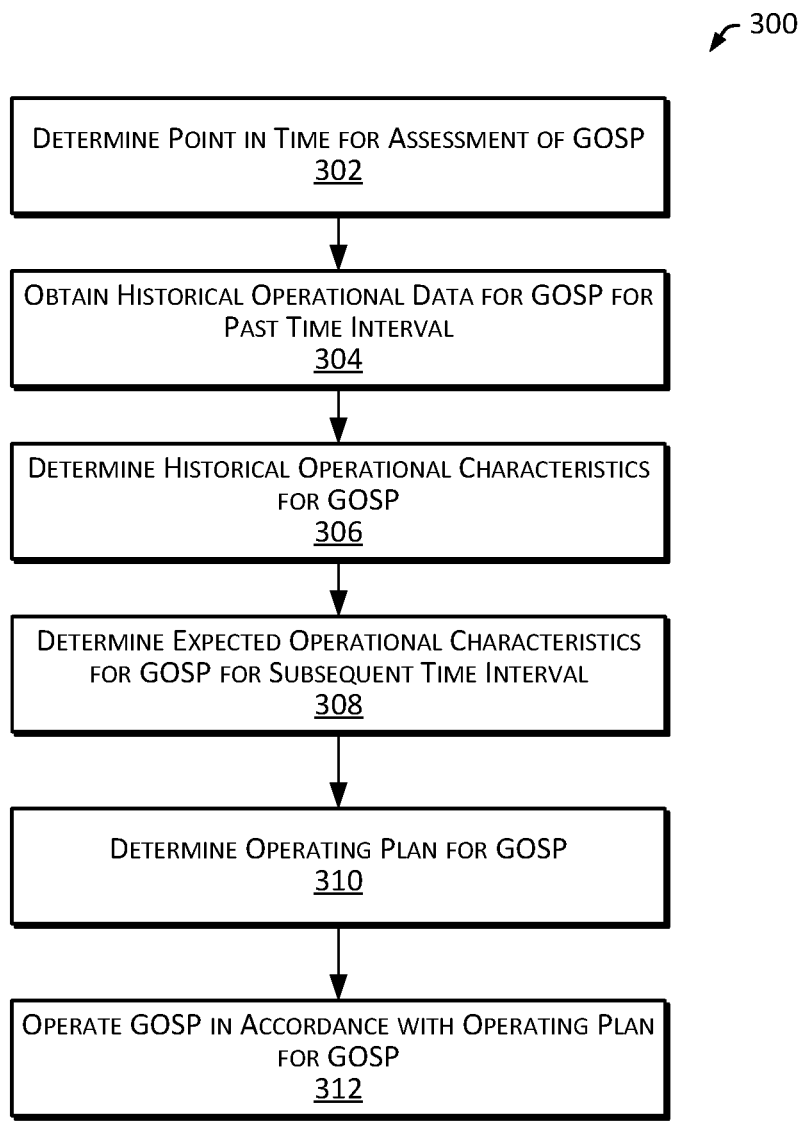
FIG. 3 is a flowchart that illustrates a method of operating a process facility in accordance with one or more embodiments.

FIG. 3 is a flowchart that illustrates a method 300 of operating a process facility in accordance with one or more embodiments. In the context of the GOSP 100, some or all of the operations of method 300 may be performed, for example, by the control system 104 (or another operator of the GOSP 100).

In some embodiments, method 300 includes determining a point in time for assessment of a GOSP (block 302). This may include the control system 104 (or another operator of the GOSP 100) identifying a point in time before which historical operational data 130 for the GOSP 100 is available and after which it is desirable to identify expected operational characteristics 134 of the GOSP that can be used to determine an operating plan 136 for the GOSP 100. For example, the point in time may be a current point in the day of Aug. 1, 2019, where the historical operational data 130 includes operational data for the 5 years leading up to the point in the day of Aug. 1, 2019 and it is desirable to identify expected operational characteristics 134 and an operating plan 136 for the day, week, or month following Aug. 1, 2019.

In some embodiments, method 300 includes obtaining historical operational data for the GOSP for a past (or "historical") time interval (block 304). This may include the control system 104 (or another operator of the GOSP 100) retrieving the historical operational data 130 for the GOSP 100 for the historical time interval. The historical time interval may be an interval of time that precedes the given point in time. In some embodiments, the historical time interval is one year in length or longer. For example, the historical time interval may be one, two, three, four, five, six, seven or more years in length. Continuing with the prior example, the historical operational data 130 may be indicative of actual (or "observed") operational characteristics of the GOSP over the five years preceding (or "leading up to") Aug. 1, 2019.

In some embodiments, method 300 includes determining (based on the historical operational data) historical operational characteristics of the GOSP for the historical time interval (block 306). This may include the control system 104 (or another operator of the GOSP 100) determining (based on the historical operational data 130) historical operational characteristics 132 of the GOSP 100 for the historical time interval. In some embodiments, this includes, for each of the operational characteristics, determining the following based on the historical operational data 130: (a) for each month of the historical time interval, an average monthly value determined based on values of the operational characteristic over the month; (b) for each week of the historical time interval, an average weekly value determined based on values of the operational characteristic over the week; and (c) for each day of the historical time interval, a daily value determined based on a value of the operational characteristic for the day (see, e.g., the example listing of historical operational characteristics 132 of FIG. 2).

In some embodiments, the historical operational characteristics include energy key performance indicators (KPIs). An energy KPIs for a given period of time (or "time interval") may be indicative of a ratio of resource consumption to product production for the given period of time. For example, determining (based on the historical GOSP operational data) historical operational characteristics of the GOSP for the historical time interval may include determining for each day, week and month of the historical time interval, a respective daily, weekly and monthly energy KPI determined based on the corresponding daily, weekly or monthly values of the historical operational characteristics.

In some embodiments, an energy KPI is determined according to the following relationship:

$$EnergyKPI = \frac{Power + FuelGas}{OilProduction + SourGasExport + GasExport + NGL}, \quad (1)$$

where EnergyKPI is the energy KPI for a given period of time, Power+FuelGas is a sum of power consumption and fuel gas consumption for the given period of time, and OilProduction+SourGasExport+GasExport+NGL is a sum of oil production, sour gas export, gas export, and NGL export for the period of time. For example, a daily energy KPI may be determined according to the following relationship:

$$EnergyKPIDaily = \frac{Daily(Power + FuelGas)}{Daily(OilProduction + SourGasExport + GasExport + NGL)}, \quad (2)$$

where EnergyKPIDaily is the energy KPI for a given day, where Daily(Power+FuelGas) is a sum of power consumption and fuel gas consumption for the day, and Daily (OilProduction+SourGasExport+GasExport+NGL) is a sum of oil production, sour gas export, gas export, and NGL export for the day. A weekly energy KPI may be determined according to the following relationship:

$$EnergyKPIWeekly = \frac{\text{Weekly(Power} + FuelGas)}{\text{Weekly}(OilProduction + SourGasExport + } \quad (3)$$
$$GasExport + NGL)$$

where EnergyKPI Weekly is the energy KPI for a given week, where Weekly(Power+FuelGas) is a sum of power consumption and fuel gas consumption over the week, and Monthly(OilProduction+SourGasExport+GasExport+NGL) is a sum of oil production, sour gas export, gas export, and NGL export over the week. A monthly energy KPI may be determined according to the following relationship:

$$EnergyKPIMonthly = \frac{\text{Monthly(Power} + FuelGas)}{\text{Monthly}(OilProduction + SourGasExport + } \quad (4)$$
$$GasExport + NGL)$$

where EnergyKPIMonthly is the energy KPI for a given month, Monthly(Power+FuelGas) is a sum of power consumption and fuel gas consumption over the month, and Monthly(OilProduction+SourGasExport+GasExport+NGL) is a sum of oil production, sour gas export, gas export, and NGL export over the month.

Continuing with the prior example of the historical time interval being the 5 five years preceding Aug. 1, 2019, the historical operational characteristics 132 of the GOSP may include, for each, day, week and month of the five years preceding Aug. 1, 2019, a corresponding value for each of the following: oil production; power consumption; gas export; crude export; sour gas export; NGL export; and fuel gas consumption; and an energy KPI.

In some embodiments, method 300 includes determining (based on the historical operational characteristics of the GOSP for the historical time interval) expected operational characteristics of the GOSP for a subsequent (or "future") time interval (block 308). This may include the control system 104 (or another operator of the GOSP 100) determining (based on the historical operational characteristics 132 of the GOSP 100 for the historical time interval) expected operational characteristics 134 of the GOSP 100 for a subsequent (or "future") time interval. The future time interval may be an interval of time that follows the given point in time. In some embodiments, the future time interval is one day in length or longer. For example, the future time interval may be one day, one month, or one year in length. The expected operational characteristics 134 may be indicative of expected (or "predicted") operational characteristics of the GOSP 100 over the future time interval. Continuing with the prior example, the expected operational characteristics 134 may be indicative of expected (or "predicted") operational characteristics of the GOSP 100 over the day, week or year following Aug. 1, 2019.

In some embodiments, an expected value of an operational characteristic is determined based on the historical values for the operational characteristic. For example, the historical values for an operational characteristic may be used to determine probabilities of moving between values of the operational characteristic, the current value of the operational characteristic at or near the point in time may be determined, and the value associated with the highest probability move from the current value may be identified as the expected value for the operational characteristic. Thus, for example, if the daily oil production for the day preceding Aug. 1, 2019 is 1,000 barrels, and it is determined (e.g., based on an assessment of the daily historical values for oil production over the five years preceding Aug. 1, 2019) that that a day of 1,000 barrels of oil production is most likely followed by a day of 1,100 barrels of oil production (e.g., of the possible moves from a day of 1,000 barrels of oil production, the move to a day of 1,100 barrels of oil production has the highest probability of the possible moves), then 1,100 barrels may be identified as the expected value of oil production for Aug. 2, 2019. Continuing, if the weekly oil production for the week preceding Aug. 1, 2019 is 7,100 barrels, and it is determined (e.g., based on an assessment of the weekly historical values for oil production over the five years preceding Aug. 1, 2019) that that a week of 7,100 barrels of oil production is most likely followed by a week of 6,900 barrels of oil production (e.g., of the possible moves from a week of 7,100 barrels of oil production, the move to a week of 6,900 barrels of oil production has the highest probability of the possible moves), then 6,900 barrels may be identified as the expected value of oil production for the week following Aug. 1, 2019 (e.g., for the week of Aug. 2, 2019-Aug. 8, 2019). Continuing, if the monthly oil production for the month preceding Aug. 1, 2019 is 31,000 barrels, and it is determined (e.g., based on an assessment of the monthly historical values for oil production over the five years preceding Aug. 1, 2019) that that a month of 31,000 barrels of oil production is most likely followed by a month of 34,000 barrels of oil production (e.g., of the possible moves from a month of 31,000 barrels of oil production, the move to a month of 34,000 barrels of oil production has the highest probability of the possible moves), then 34,000 barrels may be identified as the expected value of oil production for the month following Aug. 1, 2019 (e.g., for the month of Aug. 2, 2019-Jul. 1, 2019). A similar assessment may be conducted for each of the other operational characteristics (including the energy KPI) to determine a set of expected operational characteristics that includes corresponding expected daily, weekly and monthly values for each of the operational characteristics (including the energy KPI) (see, e.g., the example listing of expected operational characteristics 134 of FIG. 2).

In some embodiments, an expected value of an operational characteristic is determined by way of a transition probability matrix for the operational characteristics that is generated based on the historical values of the operational characteristic. For example, an expected value of an operational characteristic may be determined according to the following relationship:

$$[E] = \Sigma P * V \quad (5),$$

where [E] is the expected value of the operational characteristic, P is the probability of an event of moving from a current value V of the operational characteristic (or "state") to another of the possible values (or "states") of the operational characteristic.

Figure 4:
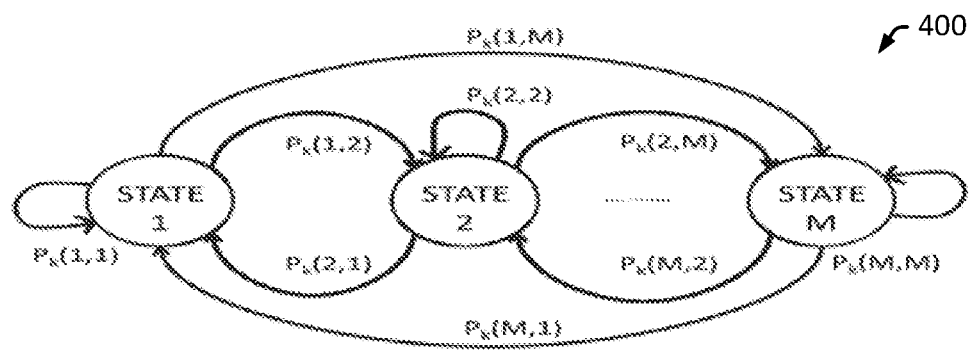
FIG. 4 is a diagram that illustrates a Discrete Time Markov Chain (DTMC) transition diagram in accordance with one or more embodiments.

In some embodiments, P is computed by way of a Discrete Time Markov Chain (DTMC) approach where an event and next state is only dependent on the current state, as demonstrated by the following relationships (and the DTMC transition diagram 400 illustrated in FIG. 4):

$$(X_{n+1}=j|X_m=i, m-1=i_{m-1}, \ldots, X_0=i_0) = (X_{m+1}=j|X_m=i) \quad (6),$$

$$\forall m \geq 0 \forall i, \in S \forall i_0, \ldots, m-1 \in S \quad (7),$$

where $X_{m+1}$ is the next state, as shown in the DTMC transition diagram illustrated in FIG. 4.

In some embodiments, after designing the proper DTMC for the system and the operational characteristic, a transition probability matrix for the operational characteristic can be built as follows:

$$P = \begin{bmatrix} P_{1,1} & P_{1,2} & \cdots & P_{1,M} \\ P_{2,1} & P_{2,2} & \cdots & P_{2,M} \\ \vdots & \vdots & \ddots & \vdots \\ P_{M,1} & P_{M,2} & \cdots & P_{M,M} \end{bmatrix}, \quad (8)$$

$$\sum_{j=1}^{M} Pi, j = 1, \quad (9)$$

where Pi,j represents the transition probability of moving from state i to state j. The actual value of each element in the P matrix can be determined by computing the frequency that each state is visited in accordance with the following relationships:

$$Pi, j = \frac{Ni, j}{Ni}, \quad (10)$$

$$qi = \frac{Ni}{N}, \quad (11)$$

$$Q = [q_1, q_2, \ldots, q_s] \quad (12)$$

$$Pr\{X_1, \cdots, X_T\} = q_{x_1} \cdot \prod_{t=2}^{T} p_{x_{t-1}, x_t} \quad (13)$$

where:
- Ni,j=total count of how many times the pairs (Xn & Xn+1) appeared in the historical operational data;
- Ni.=total count of how many events of leaving transition from state (Xn) to all other states in the historical operational data;
- Ni=total count of how many times state i appeared in the historical operational data.
- N=total number of all states;
- qi=probability that the system is in state i at time 0; and
- Pr is used to compute the sequence probability.

In some embodiments, equations (8)-(13) are applied to each operational characteristic (or "parameter") to generate a complete transition probability matrix for each respective operational characteristic (including the energy KPI). Thus, for example, a daily, weekly, and monthly transition matrix may be generated for each of the following: oil production; power consumption; gas export; crude export; sour gas export; NGL export; fuel gas consumption; and energy KPI. For each of the operational characteristics, a current value of the operational characteristic may be input to the transition probability matrix to generate a corresponding expected value of the operational characteristic. Continuing with the prior example, the current value of 1,000 barrels of oil production may be applied to a daily oil production transition probability matrix to determine the expected value of 1,100 barrels of oil production for Aug. 2, 2019, the current value of 7,100 barrels of oil production may be applied to a weekly oil production transition probability matrix to determine the expected value of 6,900 barrels of oil production for the week following Aug. 1, 2019, the current value of 31,000 barrels of oil production may be applied to a monthly oil production transition probability matrix to determine the expected value of 34,000 barrels of oil production for the month following Aug. 1, 2019. A similar assessment may be made for each of the respective operational characteristics (including the energy KPI), to generate expected next day, week and month values for each of the operational characteristics (including the energy KPI).

In some embodiments, method 300 includes determining (based on the values of the expected operational characteristics) an operating state (or "plan") for the GOSP (block 310). This may include the control system 104 (or another operator of the GOSP 100) determining (based on the values of the expected operational characteristics 134) an operating plan 136 for the GOSP 100. In some embodiments, this includes determining, for the expected values of oil production, a corresponding optimal value for each of power consumption, gas export, crude export, sour gas export, NGL export, and energy KPI. This may also include, determining expected value of water injection rates and determining, for the expected water injection rates, a corresponding optimal value for fuel gas consumption. The expected values of water injection rate may, for example, be a user specified value that corresponds to a water injection rate for a well (or wells) serviced by the GOSP 100.

In some embodiments, the optimal value for each of power consumption, gas export, crude export, sour gas export, NGL export, and energy KPI is determined by application of a nearest neighbor algorithm to the historical operational characteristics 132 of the GOSP 100 for the historical time interval and the expected oil production day, week and month values to identify past (or "historical") oil production operating conditions that are associated with (or "nearest") the respective expected oil production values. The oil production operating conditions may include a set of oil production parameters that include historical observed daily, weekly or monthly parameters for power consumption, gas export, crude export, sour gas export, NGL export, and energy KPI that correspond to the expected daily, weekly or monthly oil production values. A minimization operation may be conducted on the set of oil production parameters to identify a minimum (or "optimal") value for each of the parameters. This may generate, for example, an optimal daily value, an optimal weekly, and an optimal monthly value for each of power consumption, gas export, crude export, sour gas export, NGL export, and energy KPI that correspond to the respective expected oil production values for the next day, week and month.

In some embodiments, the optimal value for fuel gas consumption is determined by application of a nearest neighbor algorithm to the historical operational characteristics 132 of the GOSP 100 for the historical time interval and the expected water injection rate day, week and month values to identify past (or "historical") water injection operating conditions that are associated with (or "nearest") the respective expected water injection rates. The water injection operating conditions may include a set of daily, weekly and monthly water injection parameters that include historical observed parameters for fuel gas consumption that correspond to the expected daily, weekly or monthly water injection rates. A minimization operation may be conducted on the set of water injection parameters to identify a minimum (or "optimal") value for each of the parameters. This may generate, for example, an optimal daily, optimal weekly and optimal monthly value for fuel gas consumption that corresponds to the respective expected water injection rates for the next day, week and month.

In some embodiments, a "delta" value is generated for each of the expected operational characteristics. The delta value for an operational characteristic may be indicative of a difference between the expected value for the operational characteristic and the optimal value for the operational characteristic. In some embodiments, the delta value for an operational characteristic is determined according to the following relationship:

$$\Delta = \frac{V_{expected} - V_{optimal}}{V_{optimal}}, \quad (14)$$

where $\Delta$ is the "delta" value for the expected operational characteristic, $V_{expected}$ is the value of the expected operational characteristic, and $V_{optimal}$ is the optimal value of a parameter associated with the expected operational characteristic. If, for example, the expected and optimal value of daily power consumption were 1.1 kilowatt (kW) and 1.0 kW, respectively, equation (14) may be applied to determine a delta value of 0.1 (or about 10%). A delta value may be determined for each of the expected daily value, the expected weekly value, and the expected monthly value for each of power consumption, gas export, crude export, sour gas export, NGL export, fuel gas consumption, and energy KPI that correspond to the respective expected oil production and water injection rates (see, e.g., the example listing of "deltas" in the expected operational characteristics 134 of FIG. 2).

In some embodiments, an expected amount of demand steam can be determined for each of the next day, week and year, based on the associated expected daily, weekly, and monthly values for each of power consumption, gas export, crude export, sour gas export, NGL export, or energy KPI. Continuing with the prior example, an expected amount of demand steam for Aug. 2, 2019 may be determined based on the associated expected daily values for power consumption, gas export, crude export, sour gas export, NGL export, or energy KPI.

In some embodiments, an expected number of heat gas turbines 110 and HRSG to operate can be determined for each of the next day, week and year, based on the associated expected daily, weekly, and monthly values for water injection rate. Continuing with the prior example, an expected number of gas turbines 110 and HRSG 112 to operate on Aug. 2, 2019 may be determined based on the associated expected daily value for water injection rate. That is, the minimum number of gas turbines 110 and HRSGs to support the water injection rate for the day may be determined.

In some embodiments, the maximum amount of steam that can be generated from the expected number of gas turbines 110 and HRSGs 112 may be determined and subtracted from the demand steam to determine if there is any excess steam demand that should be provided by another source, such as the boilers 114. If so, a number of boilers 114 needed to supply the excess steam demand can be determined. Continuing with the prior example, if the expected demand steam for Aug. 2, 2019 exceeds the amount of steam to be generated by the expected number of gas turbines 110 and HRSGs 112 to operate on Aug. 2, 2019, a number of boilers 114 can be determined by dividing the excess steam demand by the capacity of a boiler 114, and rounding-up to the next whole number to determine a given number of boilers 114 that are expected to be needed to meet the "expected" demand steam for Aug. 2, 2019. A "next day plan of operation" can be generated for Aug. 2, 2019 that includes the following: operating at the expected oil production; operating at the expected water injection rate; operating the minimum number of gas turbines 110 and HRSGs 112 to support the expected water injection rate; and operating the number of boilers 114 needed to meet the demand steam. A similar approach and plan can be applied for each of the week and the month following Aug. 2, 2019 based on the expected weekly and monthly values.

In some embodiments, method 300 includes operating the GOSP in accordance with the operating plan for the GOSP (block 312). This may include the control system 104 (or another operator of the GOSP 100) operating the GOSP 100 in accordance with the operating plan 136 for the GOSP 100. For example, in view of an operating plan 136 that specifies a number of gas turbines 110, HRSGs 112 and boilers 114 to run, and an amount of fuel gas to be consumed, an operator may proactively ready the gas turbines 110, HRSGs 112 and boilers 114 prior to the time they are needed, as well as ensure that sufficient fuel gas is on hand to operate them accordingly during the identified time period. Such a system may enable an operator of the GOSP 100 to anticipate conditions before they occur and to take proactive measures to prepare for the conditions. As a result, an operator may be able to operate the GOSP 100 closer to the requirements of the oil production and water injection rates for a well (or wells) that is services, without having too many or too few resources available for effectively operating the GOSP 100 to process the production and provide corresponding injection products.

Figure 5:
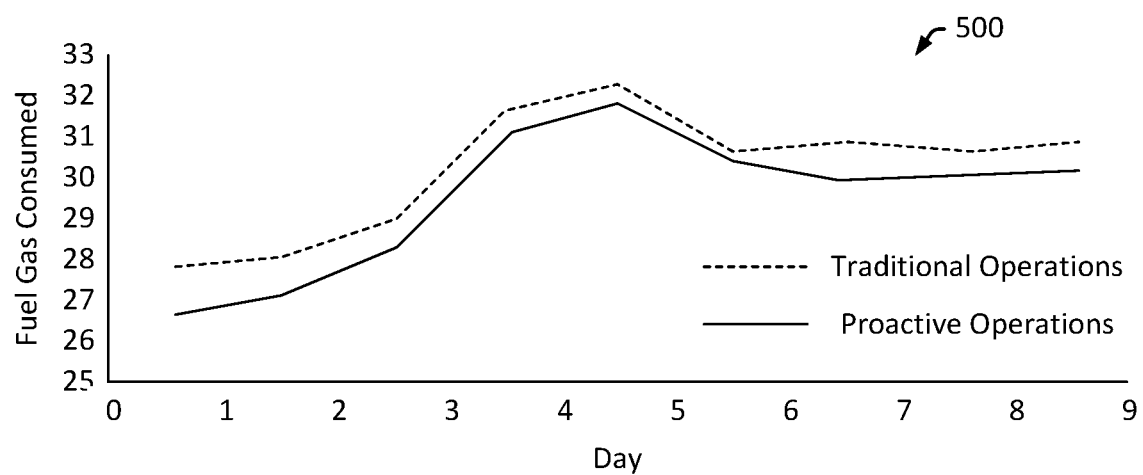
FIG. 5 is a diagram that illustrates results of operating a process facility in accordance with one or more embodiments.

FIG. 5 is a diagram that illustrates results 500 of operating a GOSP in accordance with one or more embodiments. As illustrated, operating a GOSP in accordance with the "proactive approach" of the embodiments described here (e.g., including employing an operating plan based on expected operating characteristics determined based on historical operating characteristics) can save considerable resources (e.g., fuel gas) in comparison to a traditional approach (e.g., a reactive approach based on current operating conditions).

Figure 6:
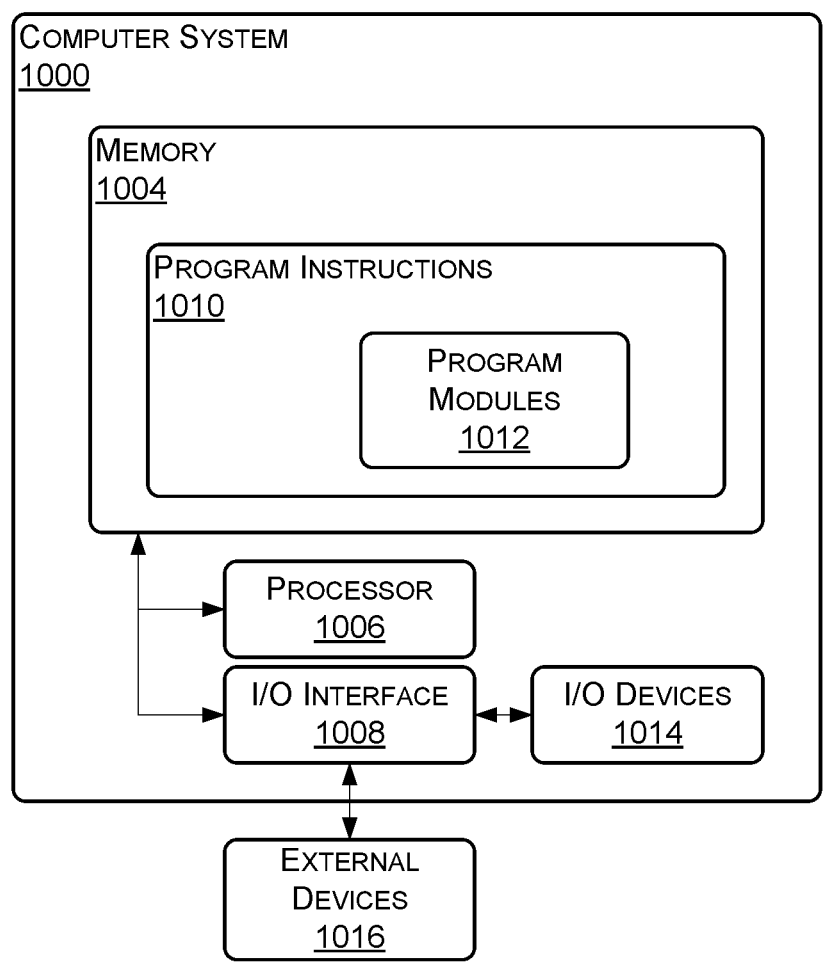
FIG. 6 is a diagram that illustrates an example computer system in accordance with one or more embodiments.

FIG. 6 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the control system 104 (or another operator of the GOSP 100) or the method 300.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include sensors or controls of the GOSP 100.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of operating a gas oil separation plant (GOSP), the method comprising:
   obtaining operational data for the GOSP, the operational data indicative of operational characteristics of the GOSP observed over a historical time interval, the historical time interval comprising an interval of time preceding a given point in time, the operational characteristics comprising:
      oil production;
      power consumption;
      gas export;
      crude export;
      sour gas export;
      natural gas liquids (NGL) export;
      fuel gas consumption; and
      energy key performance indicator (KPI);
   determining, based on the operational data, historical operational characteristics of the GOSP for the historical time interval, the historical operational characteristics comprising, for each of the operational characteristics:
      (a) for each month of the historical time interval, an average monthly value determined based on values of the operational characteristic over the month;
      (b) for each week of the historical time interval, an average weekly value determined based on values of the operational characteristic over the week; and
      (c) for each day of the historical time interval, a daily value determined based on a value of the operational characteristic for the day:
   determining, based on the historical operational characteristics, expected operational characteristics of the GOSP for a future time interval, the future time interval comprising an interval of time following the given point in time, the expected operational characteristics comprising, for each of the operational characteristics:
      (a) an expected next month value determined based on the average monthly values for the operational characteristic;
      (b) an expected next week value determined based on the average weekly values for the operational characteristic; and
      (c) an expected next day value determined based on the daily values for the operational characteristic;
   the determination of the expected operational characteristics comprising:
      for each of the expected operational characteristics:
         determining, based on the historical operational characteristics, a transition probability matrix that is indicative of probabilities of moving between possible values of the corresponding operational characteristic; and applying a current value of the operational characteristic corresponding to the transition probability matrix to determine the value of the expected operational characteristic;

determining, based on the expected operational characteristics, an operating plan for the GOSP; and operating the GOSP in accordance with the operating plan.

2. The method of claim 1, further comprising:

for each of the expected operational characteristics:

determining, based on the historical operational characteristics, an optimal value for the corresponding operational characteristic; and determining a delta value for the expected operational characteristic that is indicative of a difference between the optimal value for the corresponding operational characteristic and the expected operational characteristic, wherein the operating plan for the GOSP comprises the delta values for the expected operational characteristics.

3. The method of claim 1, wherein the historical time interval comprises a five year interval of time preceding the given point in time.

4. The method of claim 1, wherein the expected operational characteristics comprise the following:

expected next day oil production that is indicative of an expected amount of oil production over the day following the given point in time;

expected next week oil production that is indicative of an expected amount of oil production over the week following the given point in time;

expected next month oil production that is indicative of an expected amount of oil production over the month following the given point in time;

expected next day power consumption that is indicative of an expected amount of power consumption over the day following the given point in time;

expected next week power consumption that is indicative of an expected amount of power consumption over the week following the given point in time;

expected next month power consumption that is indicative of an expected amount of power consumption over the month following the given point in time;

expected next day gas export that is indicative of an expected amount of gas export over the day following the given point in time;

expected next week gas export that is indicative of an expected amount of gas export over the week following the given point in time;

expected next month gas export that is indicative of an expected amount of gas export over the month following the given point in time;

expected next day crude export that is indicative of an expected amount of crude export over the day following the given point in time;

expected next week crude export that is indicative of an expected amount of crude export over the week following the given point in time;

expected next month crude export that is indicative of an expected amount of crude export over the month following the given point in time;

expected next day sour gas export that is indicative of an expected amount of sour gas export over the day following the given point in time;

expected next week sour gas export that is indicative of an expected amount of sour gas export over the week following the given point in time;

expected next month sour gas export that is indicative of an expected amount of sour gas export over the month following the given point in time;

expected next day NGL that is indicative of an expected amount of NGL export over the day following the given point in time;

expected next week NGL that is indicative of an expected amount of NGL export over the week following the given point in time;

expected next month NGL that is indicative of an expected amount of NGL export over the month following the given point in time;

expected next day fuel gas that is indicative of an expected amount of fuel gas consumption over the day following the given point in time;

expected next week fuel gas that is indicative of an expected amount of fuel gas consumption over the week following the given point in time;

expected next month fuel gas that is indicative of an expected amount of fuel gas consumption over the month following the given point in time;

expected next day energy KPI that is indicative of an expected energy KPI for the day following the given point in time;

expected next week energy KPI that is indicative of an expected energy KPI for the week following the given point in time; and expected next month energy KPI that is indicative of an expected energy KPI for the month following the given point in time.

5. The method of claim 1, wherein the operating plan for the GOSP specifies the following:

a number of gas turbines to operate during a given period of time;

a number of heat recovery steam generator (HRSGs) to operate during the given period of time;

a number of boilers to operate during the given period of time; and an amount of fuel gas to be consumed during the given period of time.

6. The method of claim 5, wherein operating the GOSP in accordance with the operating plan comprises:

operating the number of gas turbines during the given period of time;

operating the number of HRSGs during the given period of time;

operating the number of boilers during the given period of time; and providing the amount of fuel gas to be consumed during the given period of time.

7. The method of claim 1, wherein the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

8. A gas oil separation plant (GOSP) system, comprising:
a GOSP oil production processing system; and
a GOSP control system configured to perform the following operations:
obtaining operational data for the GOSP, the operational data indicative of operational characteristics of the GOSP observed over a historical time interval, the historical time interval comprising an interval of time preceding a given point in time, the operational characteristics comprising:
oil production;
power consumption;
gas export;
crude export;
sour gas export;
natural gas liquids (NGL) export;
fuel gas consumption; and
energy key performance indicator (KPI);
determining, based on the operational data, historical operational characteristics of the GOSP for the historical time interval, the historical operational characteristics comprising, for each of the operational characteristics:
(a) for each month of the historical time interval, an average monthly value determined based on values of the operational characteristic over the month;
(b) for each week of the historical time interval, an average weekly value determined based on values of the operational characteristic over the week; and
(c) for each day of the historical time interval, a daily value determined based on a value of the operational characteristic for the day:
determining, based on the historical operational characteristics, expected operational characteristics of the GOSP for a future time interval, the future time interval comprising an interval of time following the given point in time, the expected operational characteristics comprising, for each of the operational characteristics:
(a) an expected next month value determined based on the average monthly values for the operational characteristic;
(b) an expected next week value determined based on the average weekly values for the operational characteristic; and
(c) an expected next day value determined based on the daily values for the operational characteristic;
the determination of the expected operational characteristics comprising:
for each of the expected operational characteristics:
determining, based on the historical operational characteristics, a transition probability matrix that is indicative of probabilities of moving between possible values of the corresponding operational characteristic; and
applying a current value of the operational characteristic corresponding to the transition probability matrix to determine the value of the expected operational characteristic;
determining, based on the expected operational characteristics, an operating plan for the GOSP; and
operating the GOSP in accordance with the operating plan.

9. The system of claim 8, the operations further comprising:
for each of the expected operational characteristics:
determining, based on the historical operational characteristics, an optimal value for the corresponding operational characteristic; and
determining a delta value for the expected operational characteristic that is indicative of a difference between the optimal value for the corresponding operational characteristic and the expected operational characteristic,
wherein the operating plan for the GOSP comprises the delta values for the expected operational characteristics.

10. The system of claim 8, wherein the historical time interval comprises a five year interval of time preceding the given point in time.

11. The system of claim 8, wherein the expected operational characteristics comprise the following:
expected next day oil production that is indicative of an expected amount of oil production over the day following the given point in time;
expected next week oil production that is indicative of an expected amount of oil production over the week following the given point in time;
expected next month oil production that is indicative of an expected amount of oil production over the month following the given point in time;
expected next day power consumption that is indicative of an expected amount of power consumption over the day following the given point in time;
expected next week power consumption that is indicative of an expected amount of power consumption over the week following the given point in time;
expected next month power consumption that is indicative of an expected amount of power consumption over the month following the given point in time;
expected next day gas export that is indicative of an expected amount of gas export over the day following the given point in time;
expected next week gas export that is indicative of an expected amount of gas export over the week following the given point in time;
expected next month gas export that is indicative of an expected amount of gas export over the month following the given point in time;
expected next day crude export that is indicative of an expected amount of crude export over the day following the given point in time;
expected next week crude export that is indicative of an expected amount of crude export over the week following the given point in time;
expected next month crude export that is indicative of an expected amount of crude export over the month following the given point in time;
expected next day sour gas export that is indicative of an expected amount of sour gas export over the day following the given point in time;
expected next week sour gas export that is indicative of an expected amount of sour gas export over the week following the given point in time;
expected next month sour gas export that is indicative of an expected amount of sour gas export over the month following the given point in time;

expected next day NGL that is indicative of an expected amount of NGL export over the day following the given point in time;
expected next week NGL that is indicative of an expected amount of NGL export over the week following the given point in time;
expected next month NGL that is indicative of an expected amount of NGL export over the month following the given point in time;
expected next day fuel gas that is indicative of an expected amount of fuel gas consumption over the day following the given point in time;
expected next week fuel gas that is indicative of an expected amount of fuel gas consumption over the week following the given point in time;
expected next month fuel gas that is indicative of an expected amount of fuel gas consumption over the month following the given point in time;
expected next day energy KPI that is indicative of an expected energy KPI for the day following the given point in time;
expected next week energy KPI that is indicative of an expected energy KPI for the week following the given point in time; and
expected next month energy KPI that is indicative of an expected energy KPI for the month following the given point in time.

12. The system of claim 8, wherein the operating plan for the GOSP specifies the following:
a number of gas turbines to operate during a given period of time;
a number of heat recovery steam generator (HRSGs) to operate during the given period of time;
a number of boilers to operate during the given period of time; and
an amount of fuel gas to be consumed during the given period of time.

13. The system of claim 8, wherein operating the GOSP in accordance with the operating plan comprises:
operating the number of gas turbines during the given period of time;
operating the number of HRSGs during the given period of time;
operating the number of boilers during the given period of time; and
providing the amount of fuel gas to be consumed during the given period of time.

14. The system of claim 8, wherein the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

15. A non-transitory computer readable storage medium comprising program instructions stored thereon that are executable by a processor to perform the following operations for operating a gas oil separation plant (GOSP):
obtaining operational data for the GOSP, the operational data indicative of operational characteristics of the GOSP observed over a historical time interval, the historical time interval comprising an interval of time preceding a given point in time, the operational characteristics comprising:
oil production;
power consumption;
gas export;
crude export;
sour gas export;
natural gas liquids (NGL) export;
fuel gas consumption; and
energy key performance indicator (KPI);
determining, based on the operational data, historical operational characteristics of the GOSP for the historical time interval, the historical operational characteristics comprising, for each of the operational characteristics:
(a) for each month of the historical time interval, an average monthly value determined based on values of the operational characteristic over the month;
(b) for each week of the historical time interval, an average weekly value determined based on values of the operational characteristic over the week; and
(c) for each day of the historical time interval, a daily value determined based on a value of the operational characteristic for the day:
determining, based on the historical operational characteristics, expected operational characteristics of the GOSP for a future time interval, the future time interval comprising an interval of time following the given point in time, the expected operational characteristics comprising, for each of the operational characteristics:
(a) an expected next month value determined based on the average monthly values for the operational characteristic;
(b) an expected next week value determined based on the average weekly values for the operational characteristic; and
(c) an expected next day value determined based on the daily values for the operational characteristic;
the determination of the expected operational characteristics comprising:
for each of the expected operational characteristics:
determining, based on the historical operational characteristics, a transition probability matrix that is indicative of probabilities of moving between possible values of the corresponding operational characteristic; and
applying a current value of the operational characteristic corresponding to the transition probability matrix to determine the value of the expected operational characteristic;
determining, based on the expected operational characteristics, an operating plan for the GOSP; and
operating the GOSP in accordance with the operating plan.

16. The medium of claim 15, the operations further comprising:
for each of the expected operational characteristics:
determining, based on the historical operational characteristics, an optimal value for the corresponding operational characteristic; and
determining a delta value for the expected operational characteristic that is indicative of a difference between the optimal value for the corresponding operational characteristic and the expected operational characteristic,
wherein the operating plan for the GOSP comprises the delta values for the expected operational characteristics.

17. The medium of claim 15, wherein the historical time interval comprises a five year interval of time preceding the given point in time.

18. The medium of claim 15, wherein the expected operational characteristics comprise the following:
   expected next day oil production that is indicative of an expected amount of oil production over the day following the given point in time;
   expected next week oil production that is indicative of an expected amount of oil production over the week following the given point in time;
   expected next month oil production that is indicative of an expected amount of oil production over the month following the given point in time;
   expected next day power consumption that is indicative of an expected amount of power consumption over the day following the given point in time;
   expected next week power consumption that is indicative of an expected amount of power consumption over the week following the given point in time;
   expected next month power consumption that is indicative of an expected amount of power consumption over the month following the given point in time;
   expected next day gas export that is indicative of an expected amount of gas export over the day following the given point in time;
   expected next week gas export that is indicative of an expected amount of gas export over the week following the given point in time;
   expected next month gas export that is indicative of an expected amount of gas export over the month following the given point in time;
   expected next day crude export that is indicative of an expected amount of crude export over the day following the given point in time;
   expected next week crude export that is indicative of an expected amount of crude export over the week following the given point in time;
   expected next month crude export that is indicative of an expected amount of crude export over the month following the given point in time;
   expected next day sour gas export that is indicative of an expected amount of sour gas export over the day following the given point in time;
   expected next week sour gas export that is indicative of an expected amount of sour gas export over the week following the given point in time;
   expected next month sour gas export that is indicative of an expected amount of sour gas export over the month following the given point in time;
   expected next day NGL that is indicative of an expected amount of NGL export over the day following the given point in time;
   expected next week NGL that is indicative of an expected amount of NGL export over the week following the given point in time;
   expected next month NGL that is indicative of an expected amount of NGL export over the month following the given point in time;
   expected next day fuel gas that is indicative of an expected amount of fuel gas consumption over the day following the given point in time;
   expected next week fuel gas that is indicative of an expected amount of fuel gas consumption over the week following the given point in time;
   expected next month fuel gas that is indicative of an expected amount of fuel gas consumption over the month following the given point in time;
   expected next day energy KPI that is indicative of an expected energy KPI for the day following the given point in time;
   expected next week energy KPI that is indicative of an expected energy KPI for the week following the given point in time; and
   expected next month energy KPI that is indicative of an expected energy KPI for the month following the given point in time.

19. The medium of claim 15, wherein the operating plan for the GOSP specifies the following:
   a number of gas turbines to operate during a given period of time;
   a number of heat recovery steam generator (HRSGs) to operate during the given period of time;
   a number of boilers to operate during the given period of time; and
   an amount of fuel gas to be consumed during the given period of time.

20. The medium of claim 15, wherein operating the GOSP in accordance with the operating plan comprises:
   operating the number of gas turbines during the given period of time;
   operating the number of HRSGs during the given period of time;
   operating the number of boilers during the given period of time; and
   providing the amount of fuel gas to be consumed during the given period of time.

21. The medium of claim 15, wherein the energy KPI for a given period of time is determined according to the following relationship:

$$EnergyKPI = \frac{Power + FuelGas}{OilProduction + SourGasExport + GasExport + NGL}$$

where EnergyKPI is the energy KPI for the given period of time, Power+FuelGas is a sum of power consumption and fuel gas consumption for the given period of time, and OilProduction+SourGasExport+GasExport+NGL is a sum of oil production, sour gas export, gas export, and NGL export for the period of time.

* * * * *